(12) United States Patent
Smith

(10) Patent No.: US 8,809,241 B2
(45) Date of Patent: Aug. 19, 2014

(54) HYDRAULIC FLUID COMPOSITIONS

(71) Applicant: MacDermid Offshore Solutions, LLC, Waterbury, CT (US)

(72) Inventor: Ian D. Smith, Lancashire (GB)

( * ) Notice: Subject to any disclaimer, the term of this patent is extended or adjusted under 35 U.S.C. 154(b) by 0 days.

(21) Appl. No.: 14/017,786

(22) Filed: Sep. 4, 2013

(65) Prior Publication Data

US 2014/0034143 A1 Feb. 6, 2014

Related U.S. Application Data

(63) Continuation of application No. 13/044,613, filed on Mar. 10, 2011, now Pat. No. 8,563,484, which is a continuation of application No. 11/890,109, filed on Aug. 3, 2007, now abandoned.

(51) Int. Cl.
C09K 8/08 (2006.01)
C09K 8/04 (2006.01)
E21B 33/064 (2006.01)

(52) U.S. Cl.
CPC ... *C09K 8/08* (2013.01); *C09K 8/04* (2013.01); C09K 2208/34 (2013.01); *E21B 33/064* (2013.01)
USPC ........................................ 507/235; 166/305.1

(58) Field of Classification Search
None
See application file for complete search history.

(56) References Cited

U.S. PATENT DOCUMENTS

| 4,095,421 | A | 6/1978 | Silcox |
| 4,470,918 | A | 9/1984 | Mosier |
| 4,802,998 | A * | 2/1989 | Mueller et al. ................ 507/134 |
| 5,698,498 | A | 12/1997 | Luciani et al. |
| 5,707,940 | A | 1/1998 | Bush et al. |
| 6,032,742 | A | 3/2000 | Tomlin et al. |
| 6,192,680 | B1 | 2/2001 | Brugman et al. |
| 6,509,301 | B1 | 1/2003 | Vollmer |
| 6,554,072 | B1 | 4/2003 | Mournian et al. |
| 7,059,411 | B2 | 6/2006 | Hayes |
| 7,165,619 | B2 | 1/2007 | Fox et al. |
| 2003/0171222 | A1 | 9/2003 | Sullivan et al. |
| 2004/0167232 | A1 * | 8/2004 | Bigorra Llosas et al. ....... 516/56 |

(Continued)

FOREIGN PATENT DOCUMENTS

| EP | 0 430 602 | 6/1991 |
| EP | 1 580 320 | 3/2005 |

(Continued)

OTHER PUBLICATIONS

OSPAR List of Substances/Preparations Used and Discharged Offshore Which Are Considered To Pose Little or No Risk to Environment (PLONOR), OSPAR Convention for the Protection of the Marine Environment of the North-East Atlantic, Reference No. 2004-10E, pp. 1-9, (2004).

(Continued)

*Primary Examiner* — Alicia Bland
(74) *Attorney, Agent, or Firm* — Carmody Torrance Sandak & Hennessey LLP

(57) ABSTRACT

An aqueous hydraulic fluid composition comprising a first lubricant comprising at least one phospholipid and a second lubricant comprising an alkoxylate salt. The aqueous hydraulic fluid composition contains less than about 20% by weight (preferably none or substantially none) of an oil selected from the group consisting of mineral oils, synthetic hydrocarbon oils, and mixtures thereof. The use of alkoxylate salts provides increased lubricity and also acts as an emulsion stabilizer for the composition.

12 Claims, 3 Drawing Sheets

(56) References Cited

U.S. PATENT DOCUMENTS

| | | |
|---|---|---|
| 2005/0037928 A1 | 2/2005 | Qu et al. |
| 2006/0272820 A1* | 12/2006 | Szymanski et al. ........... 166/293 |
| 2007/0078068 A1 | 4/2007 | Askew |
| 2007/0099548 A1 | 5/2007 | Kumar et al. |

FOREIGN PATENT DOCUMENTS

| | | |
|---|---|---|
| GB | 2 123 029 A | 1/1984 |
| GB | 2 408 748 A | 6/2005 |
| WO | 98/14538 | 4/1998 |
| WO | 99/35219 | 7/1999 |
| WO | 2005/075612 | 8/2005 |

OTHER PUBLICATIONS

OSPAR List of Substances/Preperations Used and Discharged Offshore Which Are Considered To Pose Little or No Risk to the Environment (PLONOR), OSPAR Convention for the Protection of the Marine Environment of the North-East Atlantic, Meeting of the Offshore Industry Committee (OIC), (Mar. 2005).

* cited by examiner

Relative Falex Extreme Pressure performance of BOP PLONOR formulations with different lecithin concentrations (diluted to 10% - tap water)

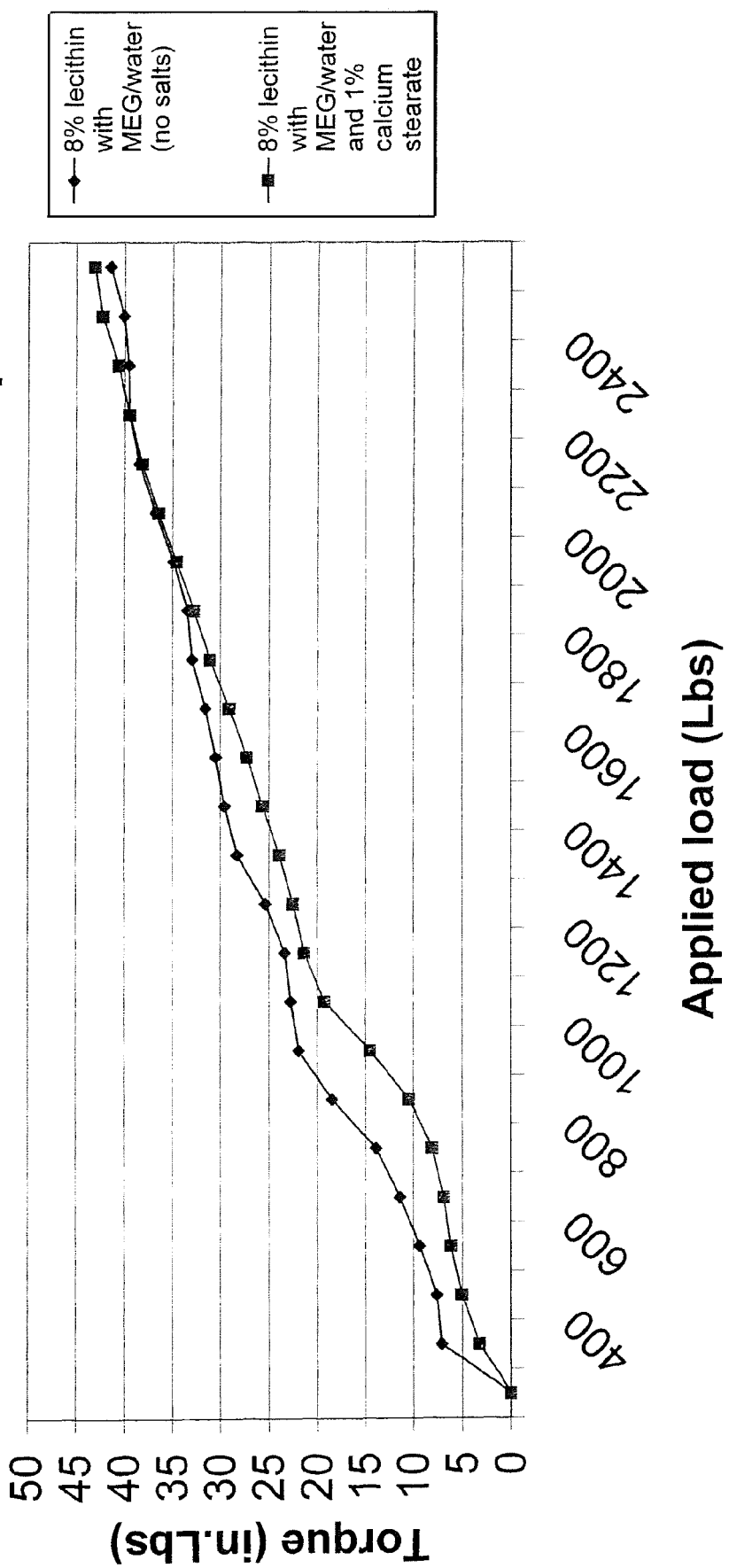

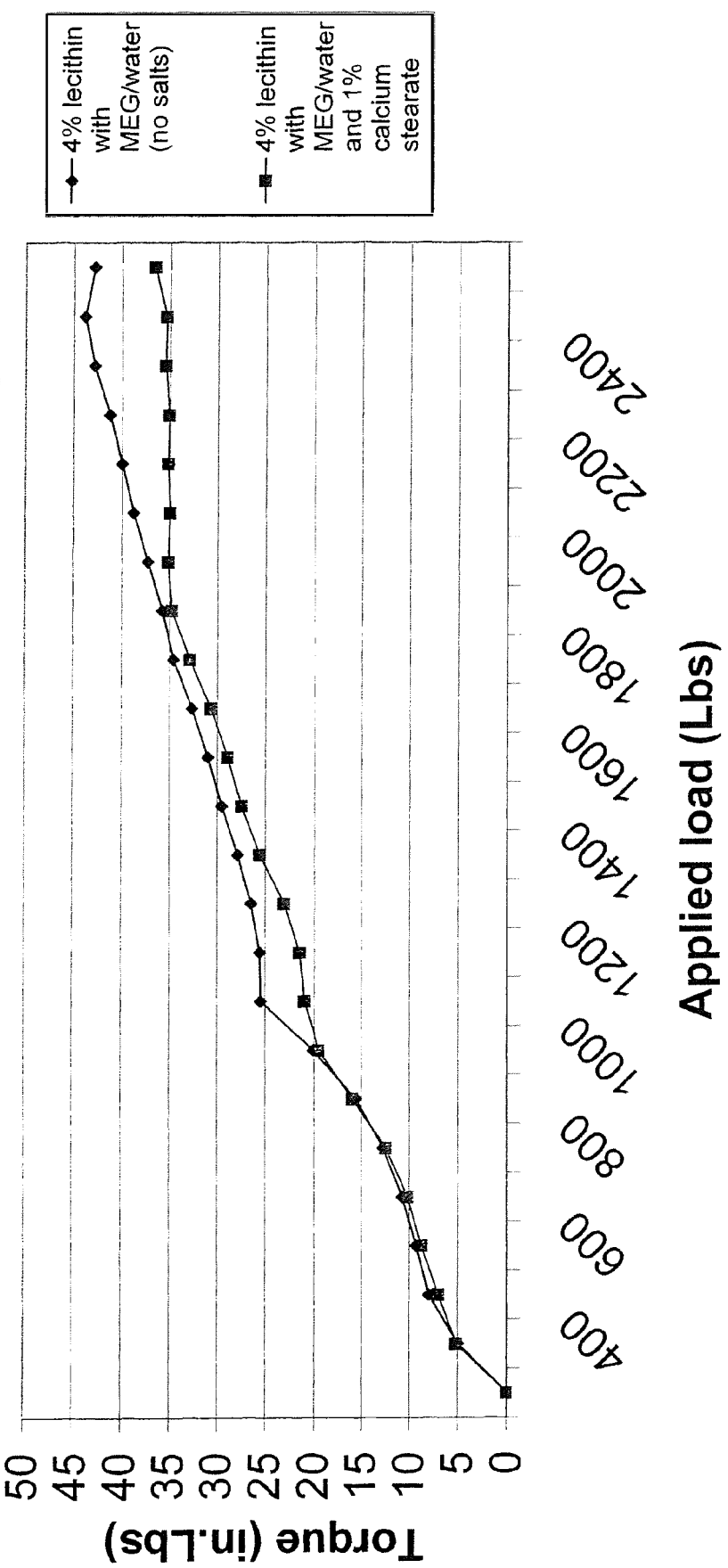

HYDRAULIC FLUID COMPOSITIONS

CROSS REFERENCE TO RELATED APPLICATIONS

This application is a continuation of U.S. application Ser. No. 13/044,613, filed Mar. 10, 2011, which is a continuation of U.S. application Ser. No. 11/890,109, filed Aug. 3, 2007, the subject matter of which is herein incorporated by reference in its entirety.

FIELD OF THE INVENTION

This invention relates to aqueous hydraulic fluid compositions, especially hydraulic fluid compositions that are suitable for use in blowout preventer devices used to control wellhead pressure of oil wells.

BACKGROUND OF THE INVENTION

Hydraulic fluids are low viscosity fluids used for the transmission of useful power by the flow of the fluid under pressure from a power source to a load. A liquid hydraulic fluid generally transmits power by virtue of its displacement under a state of stress. Hydraulic fluids generally also lower the coefficient of friction. To be effective, the compositions typically have sufficient antiwear, antiweld, and extreme pressure properties to minimize metal damage from metal-to-metal contact under high load conditions.

Hydraulic fluids are usable in blowout preventer (BOP) devices which are used to control well-head pressure of an oil well that is being drilled and/or in marine environments such as in off-shore oil drilling rigs. A "blowout" is defined herein as an uncontrolled flow of gas, oil, or other well fluids into the atmosphere or into an underground formation. A blowout (or gusher) can occur when formation pressure exceeds the pressure applied to it by the drilling or extraction apparatus. Thus, a "blowout preventer" is one of several valves installed at the wellhead to prevent the escape of pressure either in the annular space between the casing and drill pipe or in open hole (i.e., hole with no drill pipe) during drilling completion operations. The blowout preventer is a hydraulic device that forms a virtually instantaneously seal around the drill string to seal off well-head pressure when an area of high pressure such as a high pressure gas pocket has been contacted. BOP's on land rigs are typically located beneath the rig at the land's surface; on jackup or platform rigs, are located at the water's surface; and on floating offshore rigs, are located on the seafloor. A BOP control unit stores hydraulic fluid under pressure and provides a mechanism for opening and closing the BOP's quickly and reliably. The opening and closing forces in the unit are typically provided by compressed air and hydraulic pressure.

There are many reported problems associated with conventional hydraulic fluids used in BOP applications. For example, the handling of many conventional hydraulic fluids may be complicated by their combustibility, i.e., low flash points, and poor fire resistance. In addition, many conventional hydraulic fluids are toxic and accidental spillage, especially into the ocean, creates significant environmental problems.

Many conventional hydraulic fluids are not suitable for BOP applications due to their low tolerance to sea water contamination or to contamination by hydrocarbons, i.e., they tend to readily form emulsions with small amounts of hydrocarbons. Furthermore, in marine environments, problems arise due to the lack of biodegradability of the hydraulic fluid and to bacterial infestations arising in the hydraulic fluid, especially from anaerobic bacteria such as the sulfate reducing bacteria prevalent in sea water.

Other problems associated with the use of conventional hydraulic fluids under the extreme conditions encountered in BOP devices include: (1) some conventional hydraulic fluids may, cause corrosion with metals in contact with the fluid; (2) some conventional hydraulic fluids are reactive with paints or other metal coatings or tend to react with elastomeric substances or at least cause swelling of the elastomeric substance; (3) poor longterm stability, especially at elevated temperatures; (4) some hydraulic fluids require anti-oxidants to avoid the oxidation of contained components; (5) some hydraulic fluids are not readily concentrated for ease in shipping; and (6) many conventional hydraulic fluids have a non-neutral pH, thereby enhancing the opportunity for reaction with materials in contact with it. For all of these reasons, it has become advantageous to use aqueous hydraulic fluids in BOP applications and various aqueous formulations have been developed that are usable in such applications.

In addition, the demand for aqueous based hydraulic fluid compositions such as may be used in BOP devices continues to increase due to the environmental, economic and safety (e.g. high non-flammability) advantages of such fluids over conventional non-aqueous, oil-type hydraulic fluids.

The OSPAR Convention for the Protection of the Marine Environment of the North-East Atlantic, provides a list of substances used in preparations used and discharged offshore which are considered to Pose Little or No Risk to the Environment (PLONOR) which do not need to be heavily regulated. Thus, it would be desirable to have an aqueous hydraulic fluid composition that is usable in BOP applications and contains substantially only substances that are PLONOR approved.

An example of an aqueous hydraulic fluid composition that is usable in BOP devices is described in U.S. Patent Publication No. 2007/0078068 to Askew, the subject matter of which is herein incorporated by reference in its entirety. Askew describes an aqueous hydraulic fluid composition comprising at least one phospholipid lubricant which is preferably a plant-derived lecithin as the only lubricant in the composition and less than 20% by weight of a mineral oil, synthetic hydrocarbon oil or mixture thereof. Another example of an aqueous hydraulic fluid composition is described in U.S. Pat. No. 5,698,498 to Luciani et al., the subject matter of which is herein incorporated by reference in its entirety.

The inventor of the present invention has identified additional additives that can provide improved lubricity and improved stability of aqueous hydraulic fluid compositions that are usable under the extreme conditions encountered in BOP devices.

To that end, the inventor of the present invention has determined that the use of a stearate such as calcium stearate provides improved lubricity of the aqueous hydraulic fluid composition. The use of calcium stearate in the composition also provides significantly increased stability of the composition. Calcium stearate is also on the PLONOR list of acceptable substances.

SUMMARY OF THE INVENTION

It is an object of the present invention to provide an improved aqueous hydraulic fluid composition for use under the extreme conditions encountered in BOP devices.

It is another object of the present invention to provide an aqueous hydraulic fluid composition that exhibits improved lubricity.

It is still another object of the present invention to provide an aqueous hydraulic fluid concentrate that has greater stability, in both its concentrated and diluted form.

It is still another object of the present invention to provide a hydraulic fluid composition that contains materials on the PLONOR list of acceptable substances.

To that end, the present invention relates to an improved aqueous hydraulic fluid composition comprising:
a first lubricant comprising at least one phospholipid; and
a second lubricant comprising an alkoxylate salt, preferably one or more salts of alkoxylates selected from the group consisting of laurates, palmitates, oleates, and stearates;
wherein the hydraulic fluid composition comprises less than about 20% by weight (preferably none or substantially none) of an oil selected from the group consisting of mineral oils, synthetic hydrocarbon oils, and mixtures thereof.

BRIEF DESCRIPTION OF THE DRAWINGS

FIG. 2 depicts a graph of a Falex extreme pressure test performed on aqueous formulations containing 8% by weight lecithin after dilution to 10% w/w with water.

FIG. 3 depicts a graph of a Falex extreme pressure test performed on formulations containing 4% w/w lecithin after dilution to 10% w/w with water.

DETAILED DESCRIPTION OF THE PREFERRED EMBODIMENTS

Figure 1:
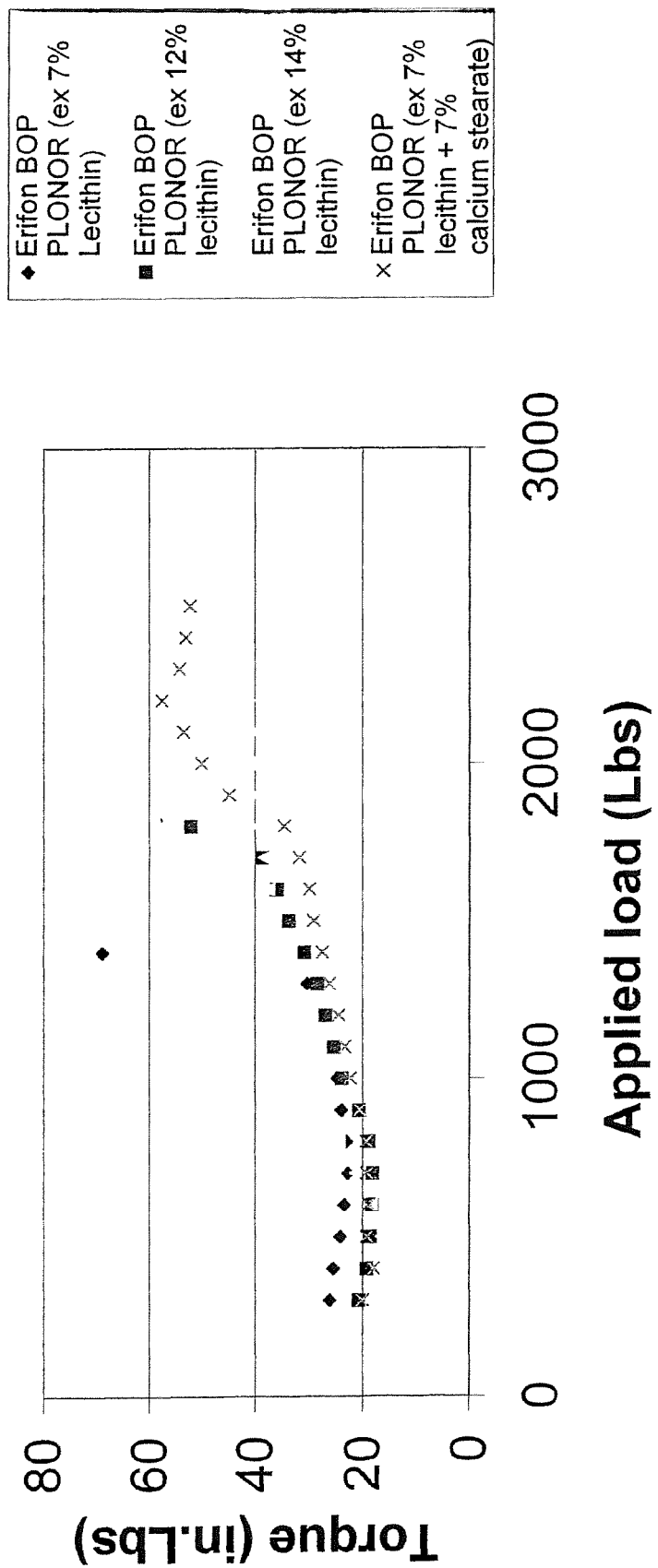
FIG. 1 depicts a graph of a Falex extreme pressure test performed on various formulations containing lecithin alone or in combination with calcium stearate.

The inventor of the present invention has discovered that the addition of a second lubricant comprising an alkoxylate salt to an aqueous hydraulic fluid composition containing a phospholipid as a first lubricant, improves the lubricity of the hydraulic fluid composition and also increases the stability of the composition, in both its concentrated state. The use of alkoxylate salts to stabilize PLONOR hydraulic fluid compositions has not previously been contemplated.

Suitable alkoxylate salts include salts of alkoxylates with from 2 to 30 carbons in the alkoxylate carbon chain (straight or branched). Preferable alkoxylate salts include alkali metal, alkaline earth and ammonium salts of (preferably calcium, magnesium and zinc salts of) laurates, palmitates, oleates and stearates, such as calcium stearate, magnesium stearate and zinc stearate. Calcium stearate is most preferred since it is on the PLONOR list.

To that end, in one embodiment, the present invent is directed to an aqueous hydraulic fluid composition comprising:
a first lubricant comprising at least one phospholipid; and
a second lubricant comprising a an alkoxylate salt;
wherein the hydraulic fluid composition comprises less than about 20% by weight (preferably none or substantially none) of an oil selected from the group consisting of mineral oils, synthetic hydrocarbon oils, and mixtures thereof.

Phospholipids usable in the formulations of the invention include any lipid containing a phosphoric acid derivative, such as lecithin or cephalin, preferably lecithin or derivatives thereof. Examples of phospholipids include phosphatidylcholine, phosphatidylserine, phosphatidylinositol, phosphatidylethanolamine, phosphatidic acid and mixtures thereof. The phospholipids may also be glycerophospholipids, more preferably, glycero derivatives of the above listed phospholipids. Typically, such glycerophospholipids have one or two acyl groups on a glycerol residue, and each acyl group contains a carbonyl and an alkyl or alkenyl group. The alkyl or alkenyl groups generally contain from about 8 to about 30 carbon atoms, preferably 8 to about 25, most preferably 12 to about 24. Examples of these groups include octyl, dodecyl, hexadecyl, octadecyl, docosanyl, octenyl, dodecenyl, hexadecenyl and octadecenyl.

The acyl groups on the glycerophospholipids are generally derived from fatty acids, which are acids having from about 8 to about 30 carbon atoms, preferably about 12 to about 24, most preferably about 12 to about 18 carbon atoms. Examples of fatty acids include myristic, palmitic, stearic, oleic, linoleic, linolenic, arachidic, arachidonic acids, or mixtures thereof, preferably stearic, oleic, linoleic, and linolenic acids or mixtures thereof.

Derivatives of phospholipids, including acylated or hydroxylated phospholipids may also be used in the practice of the invention. For instance, lecithin as well as acylated and hydroxylated lecithin may be used in the present invention and may be prepared by methods known to those skilled in the art.

Phospholipids may be prepared synthetically or derived from natural sources. Synthetic phospholipids may be prepared by methods known to those in the art. Naturally derived phospholipids are extracted by procedures known to those in the art. Phospholipids may be derived from animal or vegetable sources. Animal sources include fish, fish oil, shellfish, bovine brain and any egg, especially chicken eggs. Vegetable sources include rapeseed, sunflower seed, peanut, palm kernel, cucurbit seed, wheat, barley, rice, olive, mango, avocado, palash, papaya, jangli, bodani, carrot, soybean, corn, and cottonseed. Phospholipids may also be derived from microorganisms, including blue-green algae, green algae, bacteria grown on methanol or methane and yeasts grown on alkanes. In a preferred embodiment, the phospholipids are derived from vegetable sources, including soybean, corn, sunflower seed and cottonseed.

The present invention also contains an alkoxylate salt as a second lubricant for the hydraulic fluid composition. The inventors of the present invention have determined that while phospholipids such as lecithin are good primary lubricants for use in aqueous hydraulic fluid compositions, an improvement in lubricity is realized by adding an alkoxylate salt (preferably a metal alkoxylate salt) to the composition in an amount proportional to the concentration of phosphiolipid and in proportion to how much of the alkoxylate salt is solubilized by the solution. This may be governed, at least in part, by the (phospholipid) to alkoxylate salt ratio. If too little phospholipid to alkoxylate is used, the alkoxylate salt may be precipitated out of solution on dilution of the formulation with water. In one embodiment, about 10% phospholipid is required to prevent precipitation of the alkoxylate salt in the formulation on dilution.

It is also known that PLONOR compositions can be very difficult to stabilize. The inventor of the present invention has surprisingly discovered that the addition of the alkoxylate salt to the hydraulic fluid composition stabilizes the fluid composition, which gives the fluid compositions a much longer shelf life. In addition, formulations containing lower levels of lecithin, such as motion compensation fluids, can also be stabilized with the alkoxylate salt of the invention. While calcium stearate is the preferred alkoxylate salt for use in compositions of the invention, other alkoxylate salts including zinc stearate and magnesium stearate are also usable in compositions of the invention.

Because the alkoxylate salt, acts as a stabilizer for the hydraulic fluid composition, the need for an additional stabilizer in the formulation is eliminated. A typical PLONOR aqueous hydraulic fluid compositions that contain a boron containing salt such as borax and/or inorganic phosphate salts in lecithin/monoethylene glycol concentrates are notoriously unstable and have a tendency to phase separate very quickly especially in warm climates. Borax alone is also very difficult to stabilize in such formulations at the concentrations required. The inventors of the present invention have determined that alkoxylate salts, especially calcium stearate, act as an emulsion stabilizer as well as a lubricant in these compositions. The use of calcium stearate in the composition stabilizes the composition and prevents the composition from phase separating over a much longer period of time. Thus, the use of calcium stearate in the aqueous hydraulic fluid of the invention provides both a secondary lubricant and an emulsion stabilizer.

The aqueous hydraulic fluid compositions of the invention also preferably contain a biocide. The biocide is chosen so as to be compatible with the lubricating components, i.e., it does not affect lubricating properties. In one embodiment, a boron containing salt, such as borax decahydrate, is used as the biocide. In another embodiment the biocide may be a sulfur-containing biocide or a nitrogen-containing biocide. Nitrogen-containing biocides include triazines, oxazolidines, and guanidines as well as compounds selected from fatty acid quaternary ammonium salts, such as didecyl dimethyl quaternary ammonium chloride salt. Various biocides are described in U.S. Pat. No. 4,470,918 to Mosier and U.S. Patent Publication No. US 2007/0078068 to Askew, the subject matter of each of which is herein incorporated by reference in its entirety. The concentration of the biocide is sufficient to at least substantially prevent bacterial growth in the hydraulic fluid and preferably to kill the bacteria present.

The hydraulic fluid further comprises an antifreeze additive capable of lowering the freezing point of the hydraulic fluid to at least about −30° F., which is below the minimum temperature expected to be encountered in such environments. The antifreeze additive is chosen so as to be non-reactive with the lubricating components and biocide and is therefore not detrimental to the lubricating properties of the hydraulic fluid.

In one embodiment, the anti-freeze additive comprises at least one alcohol (preferably a dihydroxy alcohol) having from 2 to 4 carbon atoms in an amount sufficient to reduce the freezing point to below −30° F. Preferred alcohols include monoethylene glycol, glycerol, propylene glycol, 2-butene-1,4-diol, polyethylene glycols or polypropylene glycols. In one preferred embodiment, monoethylene glycol, which is PLONOR approved is used as the anti-freeze additive of the invention in an amount sufficient to reduce the freezing point of the hydraulic fluid composition to the desired temperature.

In a preferred embodiment, the hydraulic fluid composition of the invention may also contain a corrosion inhibitor that prevents corrosion and oxidation. Examples of corrosion inhibitors include, inorganic/organic phosphates, fatty carboxylic acids neutralized with an alkanolamine, amine carboxylates, alkylamines and alkanolamines as well as copper corrosion inhibitors such as benzotriazoles. Suitable alkanolamines include monoethanolamine and triethanolamine. Suitable alkylamines comprise a $C_6$-$C_{20}$ linear or branched alkyl group. Suitable alkanolamines typically comprise 1 to 12 carbon atoms, and may comprise more than one alkanol group, such as dialkanolamines and trialkanolamines. Other corrosion inhibitors usable in the practice of the invention include water-soluble polyethoxylated fatty amines and polyethoxylated diamines. The corrosion inhibitor is usable in a concentration sufficient so that substantially no corrosion occurs, i.e., corrosion, if present, results in a loss of less than 10 microns per year in the thickness of a metal in contact with the hydraulic fluid.

In addition, while the above-described embodiment is preferred for applications such as in hydraulic fluid for blowout preventers encountered in or with off-shore oil drilling rigs, other embodiments are suitable for many applications. For example, in a substantially corrosion-free environment, a corrosion inhibitor need not be included in the composition of the hydraulic fluid. Similarly, in an environment in which bacterial infestation is not a problem, the biocide may be omitted. For applications at warm or elevated temperatures, a freezing-point depressant is not required.

In a particularly preferred embodiment, the hydraulic fluid is prepared as a concentrate which must be diluted with about 9 parts water or water glycol mixture to about 1 part concentrate to achieve the working concentrations.

The present invention is further described by reference to the following non-limiting examples:

Example 1

Formulations were prepared with lecithin in the concentrate and without calcium stearate in a PLONOR formulation. A first formulation was prepared with 7% by weight lecithin in the concentrate and no calcium stearate. A second formulation was prepared with 12% by weight lecithin and no calcium stearate. A third formulation was prepared with 14% by weight lecithin and no calcium stearate. A fourth formulation contained 7% by weight lecithin and 7% by weight calcium stearate. In addition to the above ingredients the PLONOR formulations contained:

| Ingredient | Weight % |
| --- | --- |
| monoethylene glycol | 62 |
| inorganic phosphate salts | 6 |
| water | balance |

Each formulation was diluted to 10% w/w with water and a Falex extreme pressure (EP) test was performed on each fluid.

The Falex tester measures the torque experienced on a rotating test pin submerged in the test fluid, as it is subjected to increasing load. The load on the pin is increased at 100 pound increments and the torque measured at each load increment.

The results were as follows:

TABLE 1

Comparison of various aqueous hydraulic fluid compositions

| Formulation (concentration % by weight) | Maximum Applied Load (pounds) | Torque (in · Lbs) |
| --- | --- | --- |
| 7% lecithin | 1400 | 69.0 |
| 12% lecithin | 1800 | 52.1 |
| 14% lecithin | 2500 | 44.0 |
| 7% lecithin and 7% calcium stearate | 2500 | 52.3 |

A graphical representation of this data is provided in FIG. 1. As is seen, the compositions containing 14% lecithin alone and 7% lecithin with 7% calcium stearate provided the highest maximum applied load and thus the best extreme pressure performance.

Example 2

A first formulation was prepared with 8% by weight lecithin with 66% by weight monoethylene glycol (MEG) and water and a second formulation was prepared with the addition of 1% calcium stearate to the first formulation. An extreme pressure test was performed on each fluid and the data are tabulated in Table 2. A graphical representation of the data is provided in FIG. 2.

TABLE 2

Falex Extreme Pressure Test Data

| Applied Load (pounds) | 8% lecithin with MEG/water Torque (in · Lbs) | 8% lecithin with MEG/water and 1% calcium stearate Torque (in · Lbs) |
| --- | --- | --- |
| 300 | 7.1 | 3.3 |
| 400 | 7.6 | 5.1 |
| 500 | 9.4 | 6.2 |
| 600 | 11.4 | 6.9 |
| 700 | 13.9 | 8.1 |
| 800 | 18.5 | 10.5 |
| 900 | 22.0 | 14.5 |
| 1000 | 22.8 | 19.3 |
| 1100 | 23.4 | 21.4 |
| 1200 | 25.4 | 22.6 |
| 1300 | 28.3 | 24.0 |
| 1400 | 29.6 | 25.7 |
| 1500 | 30.5 | 27.3 |
| 1600 | 31.6 | 29.1 |
| 1700 | 33.0 | 31.1 |
| 1800 | 33.5 | 32.8 |
| 1900 | 34.9 | 34.6 |
| 2000 | 36.8 | 36.5 |

Example 3

A first formulation was prepared with 4% lecithin with 78% by weight monoethylene glycol (MEG) and water and a second formulation was prepared with the addition of 1% calcium stearate to the first formulation. An extreme pressure test was performed on each fluid and the data are tabulated in Table 3. A graphical representation of the data is provided in FIG. 3.

TABLE 3

Falex Extreme Pressure Test Data

| Applied Load (pounds) | 4% lecithin with MEG/water Torque (in · Lbs) | 4% lecithin with MEG/water and 1% calcium stearate Torque (in · Lbs) |
| --- | --- | --- |
| 300 | 5.0 | 5.2 |
| 400 | 8.0 | 7.0 |
| 500 | 9.3 | 8.8 |
| 600 | 10.8 | 10.2 |
| 700 | 12.8 | 12.5 |
| 800 | 15.6 | 16.0 |
| 900 | 20.1 | 19.5 |
| 1000 | 25.5 | 21.0 |
| 1100 | 25.6 | 21.5 |
| 1200 | 26.5 | 23.1 |
| 1300 | 27.9 | 25.6 |
| 1400 | 29.6 | 27.5 |
| 1500 | 31.0 | 29.0 |
| 1600 | 32.7 | 30.7 |
| 1700 | 34.6 | 32.9 |
| 1800 | 35.8 | 34.8 |
| 1900 | 37.3 | 35.2 |
| 2000 | 38.8 | 35.0 |
| 2100 | 40.0 | 35.2 |
| 2200 | 41.2 | 35.1 |
| 2300 | 42.8 | 35.5 |
| 2400 | 43.8 | 35.4 |
| 2500 | 42.8 | 36.6 |

The above examples demonstrate that the inventor of the present invention has determined that calcium stearate improves the lubricity of the formulation in every case.

It should also be understood that the following claims are intended to cover all of the generic and specific features of the invention described herein and all statements of the scope of the invention that as a matter of language might fall there between.

What is claimed is:

1. A method of actuating a valve in a marine environment using a hydraulic fluid composition, the method comprising the steps of:
   a) filling a hydraulic line, which is connected to a valve, with a hydraulic fluid comprising:
      i) a first lubricant comprising a lecithin;
      ii) a second lubricant comprising an alkoxylate salt; and
      iii) water;
   wherein the hydraulic fluid composition is at least substantially free of an oil selected from the group consisting of mineral oils, synthetic hydrocarbon oils and mixtures thereof and wherein the concentration of the alkoxylate salt and concentration of the lecithin in the hydraulic fluid are in a proportion to each other such that the alkoxylate salt is solubilized by the hydraulic fluid;
   b) applying pressure to the hydraulic fluid in the hydraulic line.

2. The method according to claim 1, wherein the hydraulic fluid composition comprises water in an amount between about 10% and about 95% by weight based on the total weight of the hydraulic fluid composition.

3. The method according to claim 1, wherein the alkoxylate salt is selected from the group consisting of calcium stearate, zinc stearate and magnesium stearate.

4. The method according to claim 3, wherein the alkoxylate salt is calcium stearate.

5. The method according to claim 1, wherein the hydraulic fluid comprises a corrosion inhibitor and the corrosion inhibitor is selected from the group consisting of inorganic phosphates, alkylcarboxylic acids neutralized with an alkanolamine, alkylamines, alkanolamines, amine carboxylates, and benzotriazoles.

6. The method according to claim 1, wherein the hydraulic fluid comprises an anti-freeze additive and the anti-freeze additive is selected from the group consisting of monoethylene glycol, glycerol, propylene glycol, 2-butene-1,4-diol, polyethylene glycols and polypropylene glycols.

7. The method according to claim 6, wherein the antifreeze additive is monoethylene glycol.

8. The method according to claim 1, wherein hydraulic fluid composition is bio-degradable and wherein substantially all of the ingredients in the hydraulic fluid composition are dischargable in a marine environment while posing little or no risk to the environment.

9. The method according to claim 1, wherein the hydraulic fluid comprises a biocide, wherein the biocide is compatible with the first lubricant and the second lubricant such that the biocide does not affect the lubricating properties of the hydraulic fluid composition.

10. The method according to claim 9, wherein the biocide is selected from the group consisting of a boron containing salt, triazines, oxazolidines, guanidines, and fatty acid quaternary ammonium salts.

11. The method according to claim 10, wherein the biocide is borax decahydrate.

12. The method according to claim 1, wherein the hydraulic fluid composition comprises between about 4-14% of the lecithin and between about 1-7% of the alkoxylate salt.

\* \* \* \* \*